US009178857B2

(12) United States Patent
Counterman

(10) Patent No.: US 9,178,857 B2
(45) Date of Patent: Nov. 3, 2015

(54) SYSTEM AND METHOD FOR SECURE CONFIGURATION OF NETWORK ATTACHED DEVICES

(75) Inventor: Raymond C. Counterman, Canton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 540 days.

(21) Appl. No.: 11/942,433

(22) Filed: Nov. 19, 2007

(65) Prior Publication Data

US 2009/0132682 A1    May 21, 2009

(51) Int. Cl.
  *H04L 29/06*  (2006.01)
  *H04L 12/24*  (2006.01)
  *H04W 8/26*   (2009.01)

(52) U.S. Cl.
  CPC ............ *H04L 63/08* (2013.01); *H04L 41/0806* (2013.01); *H04L 41/0886* (2013.01); *H04L 63/0876* (2013.01); *H04W 8/265* (2013.01); *H04L 63/102* (2013.01)

(58) Field of Classification Search
  CPC . H04L 63/08; H04L 63/0876; H04L 41/0806; H04L 41/0886; H04L 61/1582; H04L 61/2084; H04L 67/04; H04W 8/265
  USPC ................. 709/219–222, 228; 713/150–155; 380/249; 455/411, 418
  See application file for complete search history.

(56) References Cited

U.S. PATENT DOCUMENTS

| | | | |
|---|---|---|---|
| 6,980,660 B1 * | 12/2005 | Hind et al. | 380/282 |
| 7,143,435 B1 * | 11/2006 | Droms et al. | 726/3 |
| 7,188,161 B1 * | 3/2007 | O'Neil et al. | 709/220 |
| 7,430,664 B2 * | 9/2008 | Zhu et al. | 713/168 |
| 7,739,359 B1 * | 6/2010 | Millet et al. | 709/220 |
| 8,010,640 B2 * | 8/2011 | Aune et al. | 709/222 |
| 2004/0177276 A1 * | 9/2004 | MacKinnon et al. | 713/201 |
| 2005/0015499 A1 * | 1/2005 | Mayer | 709/228 |
| 2005/0031108 A1 * | 2/2005 | Eshun et al. | 379/201.12 |
| 2005/0257055 A1 * | 11/2005 | Anderson | 713/170 |
| 2006/0123118 A1 * | 6/2006 | Choe et al. | 709/227 |
| 2007/0049304 A1 * | 3/2007 | Rana et al. | 455/466 |
| 2007/0186104 A1 * | 8/2007 | Suzuki | 713/168 |
| 2007/0206773 A1 * | 9/2007 | Branam | 379/265.09 |
| 2007/0208789 A1 * | 9/2007 | Reichman | 707/205 |
| 2007/0266163 A1 * | 11/2007 | Xiong et al. | 709/228 |
| 2007/0268516 A1 * | 11/2007 | Bugwadia et al. | 358/1.15 |

(Continued)

OTHER PUBLICATIONS

Arkko et al., "Extensible Authentication Protocol Method for 3rd Generation Authentication and Key Agreement (EAP-AKA)", Request for Comments 4187, Jan. 2006.

(Continued)

*Primary Examiner* — Gregory Todd

(57) ABSTRACT

A system and method for supplying, to a provider of the device, requirements for information to be stored on a device, obtaining device data for provisioning the device on a network, storing device configuration information on storage associated with the network, receiving a service request from a user of the device, detecting attachment of the device to the network, authenticating the device utilizing a device identifier and shared credentials to enable the device to be configured without storing a network address for configuration in the device, providing network information to the device, and providing configuration information to the device.

23 Claims, 4 Drawing Sheets

(56) References Cited

U.S. PATENT DOCUMENTS

| | | | |
|---|---|---|---|
| 2007/0276905 A1* | 11/2007 | Durand et al. | 709/203 |
| 2009/0013062 A1* | 1/2009 | Blatherwick et al. | 709/222 |
| 2009/0037207 A1* | 2/2009 | Farah | 705/1 |
| 2009/0201830 A1* | 8/2009 | Angelot et al. | 370/254 |

OTHER PUBLICATIONS

Aboba et al., "PPP EAP TLS Authentication Protocol", Request for Comments 2716, Oct. 1999.

IEEE 802.11a Standard, Part 11: Wireless LAN Medium Access Control (MAC) and Physical Layer (PHY) Specifications: High-Speed Physical Layer in the 5 GHz Band, 2003.

IEEE 802.11b Standard, Part 11: Wireless LAN Medium Access Control (MAC) and Physical Layer (PHY) Specifications: Amendment 2: Higher-Speed Physical Layer (PHY) Extension in the 2.4 GHz Band—Corrigendum 1, Nov. 7, 2001.

IEEE 802.11g Standard, Part 11: Wireless LAN Medium Access Control (MAC) and Physical Layer (PHY) Specifications: Amendment 4: Further Higher Data Rate Extension in the 2.4 GHz Band, Jun. 27, 2003.

IEEE 802.3 Standard, Part 3: Carrier Sense Multiple Access With Collision Detection (CSMA/CD) Access Method and Physical Layer Specifications, Section 1, Dec. 9, 2005.

Aboba et al., "Extensible Authentication Protocol (EAP)", Request for Comment 3748, Jun. 2004.

\* cited by examiner

SYSTEM AND METHOD FOR SECURE CONFIGURATION OF NETWORK ATTACHED DEVICES

BACKGROUND INFORMATION

Devices which connect to a managed network are manufactured containing network specific information in order to obtain configuration and service upon connection to the network. Network information contained in a device may be utilized to gain unauthorized access to one or more network resources or services. Network information provided on a device by a manufacturer, such as a Universal Resource Locator (URL) of a configuration server, may be used to obtain improper access to a managed network. Additionally, providing a fixed Universal Resource Locator or other fixed network information to configure a device is inflexible and does not enable a managed network to easily change the address of a network resource, such as a configuration server, if security or reliability require such a change. This limits the ability of a device to connect to a range of networks and provide a range of services.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF PREFERRED EMBODIMENTS

An exemplary embodiment of the present invention provides a system for secure configuration of one or more network associated devices. The system may enable a service provider or other operator of a managed network to securely authenticate and configure one or more network attached devices.

Figure 1:
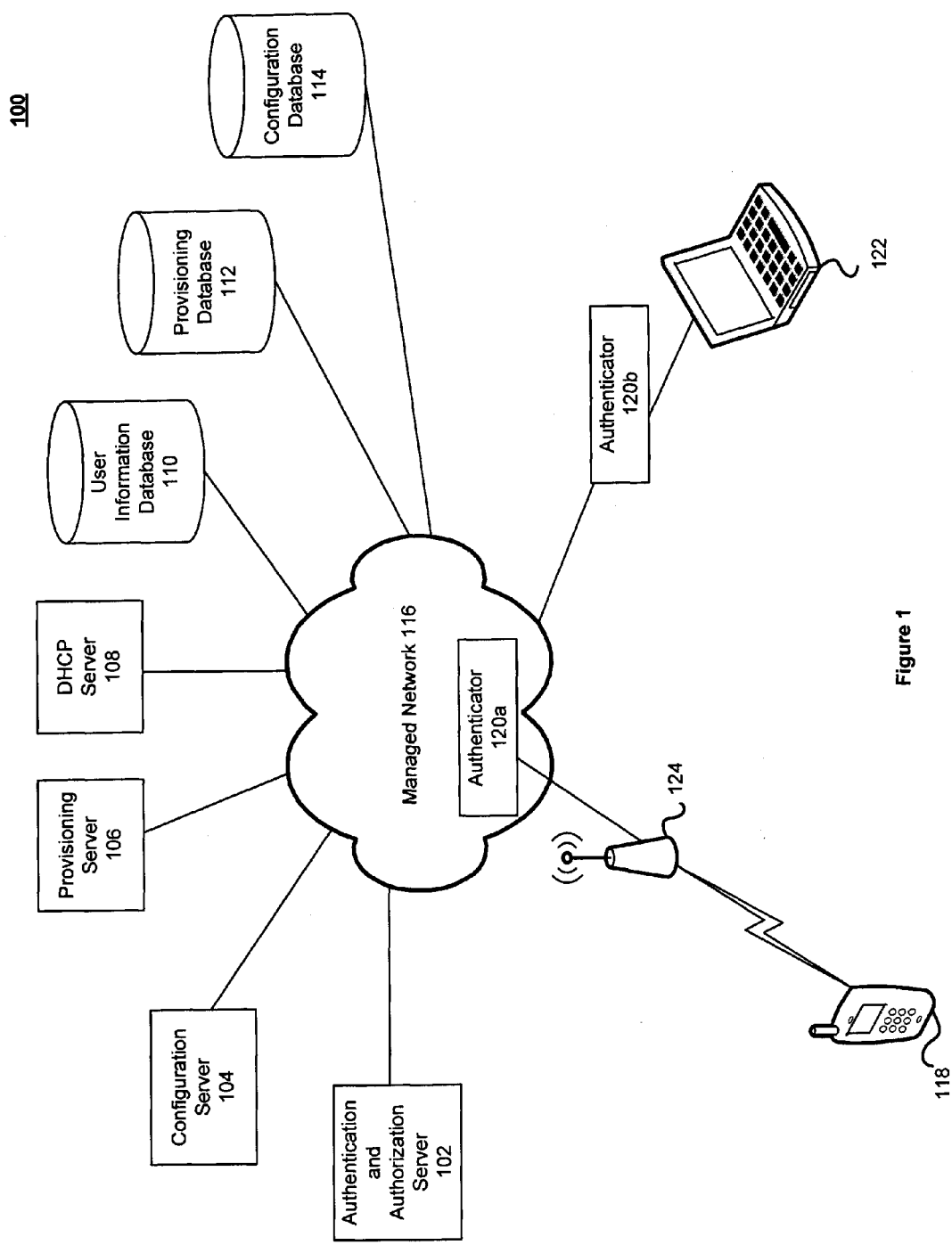
FIG. 1 is a system for secure configuration of network attached devices, in accordance with an exemplary embodiment.

Referring to FIG. 1, system for secure configuration of network attached devices in accordance with an exemplary embodiment is illustrated. Secure configuration system 100 illustrates an exemplary system for secure configuration of network attached devices. It is noted that secure configuration system 100 is a simplified view of a network and may include additional elements that are not depicted. As illustrated, managed network 116 may be a local area network (LAN), a wide area network (WAN), the Internet, cellular networks, satellite networks or other networks that permit transmission and/or reception of data to and/or from network associated devices and network elements. For example, managed network 116 may permit transmission and/or reception of data to and/or from mobile device 118 and computer 122. Authentication and authorization server 102 may be communicatively coupled to managed network 116. Authentication and authorization server 102 may authenticate and authorize requested connections from one or more devices attaching to managed network 116. Devices may attach to a network via a wireless connection or a wired connection. Devices attached to a network may be directly connected or may connect across a local LAN, such as a home network via a gateway, such as a broadband gateway, to a managed network. Configuration server 104 may be communicatively coupled to managed network 116 and may contain configuration information for one or more network attached devices supported by an operator of managed network 116. Provisioning server 106 may be communicatively coupled to managed network 116 and may receive network data, device data, service requests and/or other data and may facilitate the secure attachment of a device to managed network 116. DHCP Server 108 may provide one or more dynamic host configuration protocol (DHCP) services, such as Internet Protocol (IP) configuration services, to network attached devices across managed network 116. User information database 110 may receive, store and provide information associated with one or more users of managed network 116 and one or more network services associated with the users. User information database 110 may be communicatively coupled to managed network 116. Provisioning database 112 may be communicatively coupled to managed network 116. Provisioning database 112 may store and retrieve information related to one or more functions of provisioning server 106. Configuration database 114 may store and receive device configuration information and other data related to one or more functions of configuration server 104. Mobile device 118 may be communicatively coupled to managed network 116. Mobile device 118 may be a cellular phone, a mobile phone, a Wireless Fidelity (WiFi) phone, a satellite phone, a smart phone, a Personal Digital Assistant (PDA), a computer, or other devices capable of receiving and transmitting data to managed network 116. Authenticators 120a and 120b may be routers, radio access points, or other network access server devices and may be communicatively coupled to managed network 116. Computer 122 may access managed network 116 via authenticator 120a or 120b. Radio access point 124 may be a wireless access point, a cellular tower, a microwave tower or other access point and may be communicatively coupled to managed network 116. Mobile device 118 may access managed network 116 via authenticator 120a.

The various components of secure configuration system 100 as shown in FIG. 1 may be further duplicated, combined and/or integrated to support various applications and platforms. Additional elements may also be implemented in the systems described above to support various applications.

In one or more embodiments, managed network 116 may utilize one or more protocols of attached network devices such as mobile device 118 or computer 122. Managed network 116 may translate to or from other protocols to one or more protocols of attached network devices. Network attached devices may transmit and/or receive data to and/or from managed network 116 representing authentication and configuration data. The authentication and configuration data may be transmitted and/or received utilizing a standard telecommunications protocol or a standard networking protocol. For example, one embodiment may utilize Extensible Authentication Protocol (EAP) (Request For Comments (RFC) 3748), Extensible Authentication Protocol for Authentication and Key Agreement (EAP-AKA) (Request For Comments (RFC) 4187), or Extensible Authentication Protocol Transport Layer Security (EAP-TLS) (Request For Comments (RFC) 2716). In other embodiments, the authentication and configuration data may be transmitted and/or received utilizing the Remote Authentication Dial In User Service (RADIUS) protocol, the DIAMETER protocols or other authentication, authorization and accounting (AAA) protocols. Additionally, Dynamic Host Configuration Protocol (DHCP), other Transmission Control Protocol/Internet (TCP/IP) Protocols, or other protocols suitable for transmitting and receiving authentication and configuration data may be utilized. Data may be transmitted and received wirelessly, may utilize cabled network or telecom connections such as an Ethernet RJ45/Category 5 Ethernet connection, a fiber connection, a traditional phone wireline connection, a cable connection or other wired network connection. Network attached devices may use standard wireless protocols including IEEE 802.11a, 802.11b and 802.11g. Network attached devices may also be connected to managed network 116 via protocols for a wired connection, such as IEEE Ethernet 802.3.

Network elements, such as authentication and authorization server 102, configuration server 104, provisioning server 106, and DHCP server 108 may be one or more servers (or server-like devices), such as an application server or a network server. Network elements may include one or more processors (not shown) for recording, transmitting, receiving, and or storing data. Although network elements are depicted as individual servers, it should be appreciated that the contents of a network element may be combined into fewer or greater numbers of servers (or server-like devices) and may be connected to one or more data storage systems. For example, authentication and authorization server 102 may be connected to one or more servers containing subscription information, user equipment information, account information or authentication information. Furthermore, the server may be local, remote, or a combination thereof to authentication and authorization server 102. Additionally, portions of authorization server 102 functionality may be implemented on a network element such as authenticators 120a and 120b.

Network elements may provide application programming interfaces (APIs), interface tables, remote procedure calls (RPCs), web services, Extensible Markup Language (XML) based interfaces, Simple Object Access Protocol (SOAP) based interfaces and other interfaces for sending or receiving event information.

Provisioning server 106 may be a server, an application server, a network server, or other network element capable of accepting network and service data from a network operator, device data from one or more device providers, and/or service requests from one or more devices associated with users of managed network 116. Provisioning server 106 may receive, transmit and process data required to provide service features and options to one or more users of managed network 116 such as network parameters and values related to one or more services. Provisioning server 106 may also receive, transmit and process data related to addresses for network elements. A network operator, service provider or other administrative user of managed network 116 may enter such network and/or service related data. Provisioning server 106 may store and retrieve data from provisioning database 112, user information database 110 and/or configuration database 114. Provisioning database 112, user information database 110 and/or configuration database 114 may be combined or there may be multiple instances or implementations of such databases. One or more additional databases may be utilized by provisioning server 106.

Provisioning server 106 may also be utilized by a device manufacturer or a provider or vendor of devices which are to be attached to managed network 116, or another third party user who is known and trusted by an operator of managed network 116. The device provider, who may be the same as a network operator or service provider, may provide information to provisioning server 106 about one or more devices to be attached to managed network 116. For example, provisioning server 106 may receive information about a device to be attached to the network including a unique device identifier, the model, the model number, the device features, the device capabilities (such as Compressor/Decompressors (CODECs) utilized by the device), and other device related information which may be used to provide one or more services to the device. Provisioning server 106 may utilize this information to form one or more network policies for the device, such as a policy for managing the bandwidth of a home network through which that device may be connecting. Provisioning server 106 may receive information regarding an encryption key or other data for cryptographic methods contained on a device, such as an encryption key specified by the device manufacturer or contained in the device's digital certificate. Such an encryption key may enable provisioning server 106 to establish a shared secret with the device.

Provisioning server 106 may also receive from a provider of a device, such as mobile device 118, information about DHCP support provided by the device and/or DHCP requirements of the device. DHCP information may include options, sub-options and syntax of DHCP supported or required by the device. DHCP information may be utilized by provisioning server 106 to provide device configuration information to the device. For example, provisioning server 106 may utilize information about the DHCP capabilities of a device to provide one or more Universal Resource Locators (URLs) to the device to access configuration files and network resources on managed network 116. Provisioning server 106 may also utilize DHCP information about a network attached device to provide support for other services, such as enhanced 911 (E911) support for a mobile phone. Provisioning server 106 may utilize DHCP information about a network attached device to enable a configuration server, such as configuration server 104, to establish a secure connection from a device to a configuration server. Secure connections may be established utilizing Secure Sockets Layer (SSL), Transport Layer Security (TSL) or other cryptographic or secure protocols.

A customer may provide service request or order information which may be received by a network operator, a service provider, and/or a trusted third party. The service request or order information may include the type of service or features ordered or other service details. This information may be received by provisioning server 106. The customer, a trusted third party, an installer, or a service provider installing equipment may provide a unique device identifier associated with the device which may be a Medium Access Control (MAC) address, an Organizationally Unique Identifier and a serial number (OUI-Serial), an International Mobile Subscriber Identity, a username or other identifier.

Authenticator 120b may represent customer premise equipment (CPE) such as a Digital Subscriber Line (DSL) router, a cable modem, a Wireless Fidelity (WiFi) access point, a residential gateway, a router, or other network element capable of supporting authentication services. In some embodiments, authenticators 120a and 120b may contain multiple functions, such as network address translation, DHCP, authentication and authorization and other functionalities. Authenticator 120b may detect when a network attached device, such as computer 122, has been connected to the network. Authenticator 120b may receive a device identifier such as the Medium Access Control (MAC) address of the device. Authenticator 120b may then forward the device identifier to authentication and authorization server 102. Authenticator 120b may forward responses to authentication and authorization server 102 from a network attached device seeking to be authenticated in response to a request for authentication. Authenticator 120b may then allow or deny the transmission of data between the network attached device and the network. Authenticators, such as authenticator 120a and 120b, may deny the transmission of data by dropping packets from unauthenticated devices.

Authentication and authorization server 102 may be a server, an application server, a network server, or other network element capable of authenticating and authorizing requested connections from one or more devices attaching to managed network 116. Authentication and authorization server 102 may receive authentication information from an authenticator, such as authenticators 120a and 120b. Authentication and authorization server 102 may utilize authentication information to query one or more databases such as, user information database 110 and/or provisioning database 112. Authentication and authorization server 102 may communicate with one or more databases utilizing the RADIUS protocol, the DIAMETER protocol or other authentication, authorization and accounting protocols. Authentication and authorization server 102 may receive credentials from one or more databases which may include a shared secret key and may request credentials from one or more network attached devices seeking to authenticate. Credentials provided by a network attached device may include a device identifier, a digital certificate or other security mechanism. In some embodiments, authentication may utilize Ethernet layer 2 communications. In one or more embodiments, authentication may utilize Extensible Authentication Protocol (EAP) (Request For Comments (RFC) 3748), Extensible Authentication Protocol for Authentication and Key Agreement (EAP-AKA) (Request For Comments (RFC) 4187), Extensible Authentication Protocol Transport Layer Security (EAP-TLS) (Request For Comments (RFC) 2716) or other Extensible Authentication Protocol standards. Once credentials are received authentication and authorization server 102 may attempt to authenticate and authorize the network attached device. If authorization and/or authentication fails then network connectivity may be denied to the network attached device. If authentication and/or authorization succeeds, the network attached device may receive network and configuration information.

Configuration server 104 may be a server, an application server, a network server, or other network element capable of providing configuration information for one or more network attached devices supported by an operator of managed network 116. Configuration server 104 may provide one or more files for configuring network attachable devices supported by an operator of managed network 116. Configuration server 104 may be accessed by an URL, a fully qualified domain name, an IP address, or another network address provided to a device by DHCP Server 108 or another network entity. Configuration server 104 may connect to one or more devices using Secure Sockets Layer (SSL), Transport Layer Security (TSL) or other cryptographic or secure protocols.

DHCP server 108 may provide IP configuration services to one or more devices attached to managed network 116. The association of a device identifier, such as a MAC address, with user service information and/or hardware and software configuration of the device may be stored in one or more databases, such as provisioning database 112 or configuration database 114. DHCP server 108 may receive this information from provisioning server 106 or from another network element and may utilize this information to determine what DHCP support a device provides, what configuration information a device requires, and other service specific and device specific configuration details. DHCP server 108 may provide information to a device on the parameters and options required by a service. DHCP server 108 may also provide network addresses, such as Universal Resource Locators (URLs) of one or more configuration servers, such as configuration server 104, to the device. DHCP provided configuration information may include: host name, an IP address, a lease time, a subnet mask, a default gateway, a Network Time Protocol Server address, a Domain Name Server address, a broadcast address, a Domain Name, and other information that may be used to configure the network attached device, such as computer 122.

Figure 2:
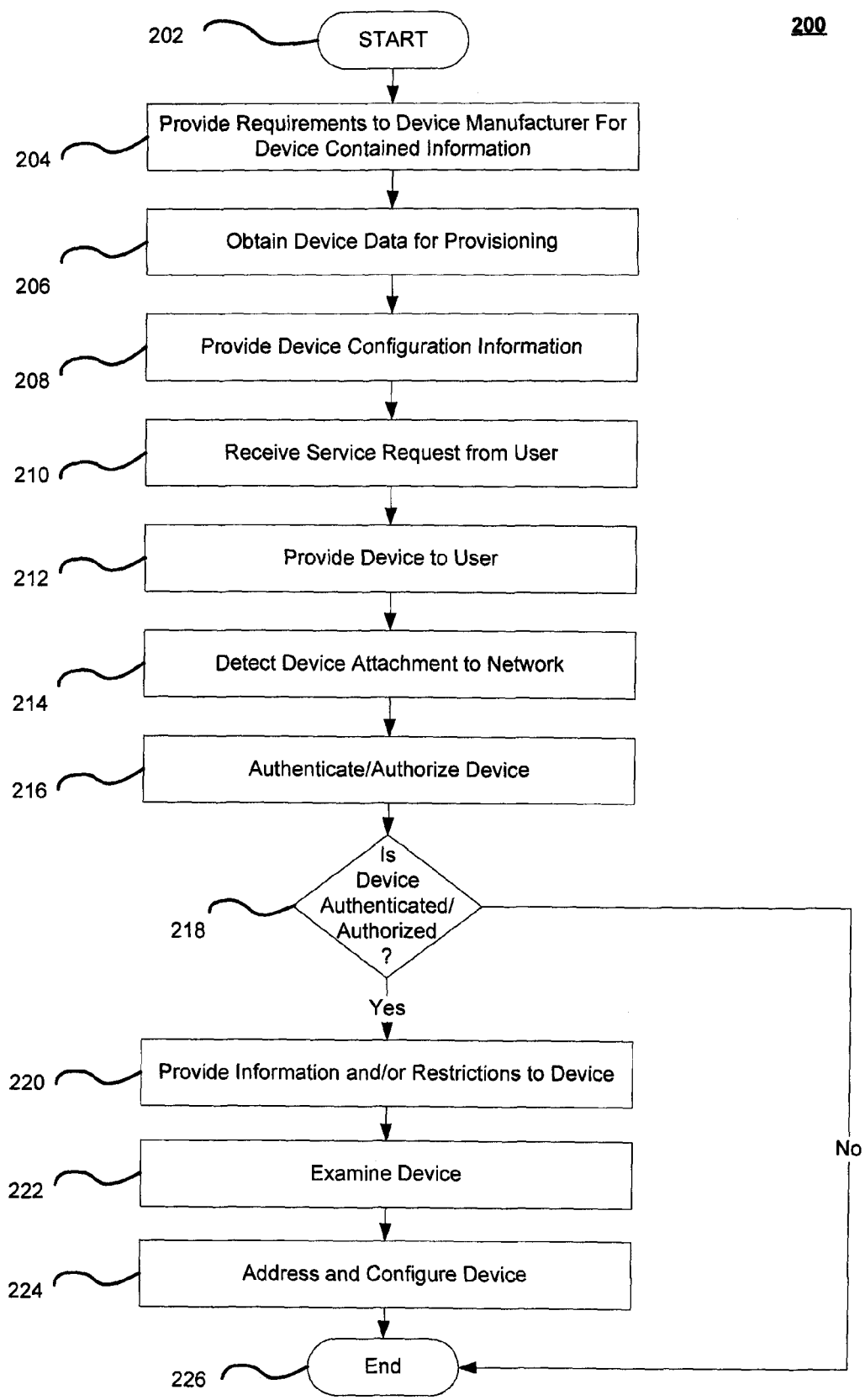
FIG. 2 depicts a method for secure configuration of network attached devices, in accordance with an exemplary embodiment.

FIG. 2 illustrates a flow diagram of a method 200 for secure configuration of network attached devices, in accordance with exemplary embodiment. This exemplary method 200 is provided by way of example, as there are a variety of ways to carry out the method. The method 200 shown in FIG. 2 can be executed or otherwise performed by one or a combination of various systems. The method 200 may be carried out by the secure configuration system 100 shown in FIG. 1 by way of example, and various elements of the secure configuration system 100 are referenced in explaining the example method of FIG. 2. Each block shown in FIG. 2 represents one or more processes, methods or subroutines carried out in exemplary method 200. Referring to FIG. 2, exemplary method 200 may begin at block 202.

At block 204, a network operator, a service provider, or a trusted third party may provide one or more requirements to manufacturers, providers, or vendors of devices in order to access a managed network such as managed network 116 and to become configured for service. The one or more requirements may include a cryptographic key, an encryption key, a digital certificate and other security features, which may be specified by a managed network operator or service provider. The one or more requirements may include a unique device identifier, such as a MAC address or other unique device identifiers. Requirements for device contained information may be reduced by the ability to authenticate a device based on a unique device identifier and an encryption key. This may improve network security by reducing network information provided on devices. This may additionally reduce manufacturing costs and may improve device configuration and authentication flexibility.

At block 206, a managed network operator or service provider may obtain device data for provisioning. A manufacturer of a device, vendor of a device or a trusted third party may be given access to a provisioning system, such as one provided by provisioning server 106. The manufacturer or other party may then enter device data obtained for provisioning the device on a network which may include one or more of: an unique device identifier, an encryption key, a device manufacturer, a device model number, a device class, the hardware capabilities of the device, the software capabilities of the device, DHCP support enabled by the device, and authentication protocol requirements of the device.

At block 208, a service provider or an operator of a managed network may make device configuration information available on the network based on device information received from a vendor or manufacturer of the device, service information known to the service provider or network operator, and other factors. The device configuration information may be stored in one or more network databases, such as provisioning database 112, configuration database 114 and other databases. The device configuration information may be accessible to one or more network elements such as authentication and authorization server 102, configuration server 104, DHCP server 108, and provisioning server 106.

At block 210, a service request may be received from a user. A service request may be an order for service to an operator of a managed network or a service provider. A service request may enable a provisioning system, such as provisioning server 106 to obtain information about the type of service and service options ordered by the user from a service provider associated with the network.

At block 212, a device may be provided to a user. A device may be distributed by an operator of a managed network, such as an installer who may distribute a device to a customer. A device may also be sold, leased, given or otherwise distributed to a user by a vendor, a manufacturer, a reseller or a third party. For example, a user may buy a mobile phone from a service provider that may be configured or "burned in" by the service provider with an encryption key. A device may also be configured or manufactured with a unique device identifier. In another example, a device, such as a set top box (STB) or a broadband gateway, may be distributed, leased, or sold to a user and may be distributed, leased or sold as part of a service plan.

At block 214, a network element on a managed network may detect the attachment of a device. For example, authenticator 120b, which may be a device previously authenticated and trusted by the network, may detect the attachment of computer 122. Authenticator 120b may represent a broadband gateway or other customer premise equipment. Authenticator 120a may represent a network element within a radio access network which may be a device previously authenticated and trusted by the network, and which may detect the attachment of mobile device 118. Communication between a device and an authenticator may utilize a layer two, or data link layer protocol, such as Ethernet. Communication may utilize Extensible Authentication Protocol (EAP) [Request For Comments (RFC) 3748], Extensible Authentication Protocol for Authentication and Key Agreement (EAP-AKA) [Request For Comments (RFC) 4187], or Extensible Authentication Protocol Transport Layer Security (EAP-TLS) [Request For Comments (RFC) 2716] or other EAP related protocols. An authenticator, such as authenticator 120a or 120b, may prevent transmission of Ethernet frames or other communication of a device to network entities on managed network 116 until the device is authenticated and authorized. Authentication at a lower network layer, such as layer two may provide increased security.

At block 216, the device may be authenticated and/or authorized. As described in more detail in reference to FIG. 3, an authenticator may detect network access by a device and may begin an authentication process. The authentication process may utilize a device identifier and an encryption key provided by the device and may use these credentials to authenticate the device. The authentication process may utilize an authentication server, such as authorization and authentication server 102 and may utilize previously provided information such as the device identifier which may be stored in one or more networked databases. In some embodiments, authorization may include verifying one or more details related to a service request prior to authentication. In some embodiments, authentication may occur prior to any authorization processing.

At block 218, the method 200 may determine whether the device is authenticated and/or authorized. If authenticated and/or authorized, the method may proceed to block 220. If authentication and/or authorization is denied, the method may end at block 226 and the device may not be sent data. Data sent by the device may be discarded.

At block 220, the information and or restrictions may be provided to a device prior to its addressing and configuration. For example, bandwidth available to a device may be limited based on a device type or service type. Other transmission characteristics permitted for device may be managed. Additionally, network traffic of a device may be directed to a network element prior to addressing and configuration of the device.

At block 222, network traffic of a device may be directed to a network element for verifying antivirus information, an operating system version, an operating system patch level, a device status or other device information. Other device hardware and software checks may be performed prior to addressing and configuration of the device.

At block 224, a device may be provided with network address and configuration information. Network information to the device includes providing at least one of: a host name, an IP address, a lease time, a subnet mask, a default gateway, a Network Time Protocol Server address, a Domain Name Server address, a broadcast address, a Domain Name, and other information that can be used to configure the network attached device. Device configuration files may also be provided. Such network information may be provided by a DHCP server, such as DHCP server 108 using information which may be associated with the device identifier and stored in databases. DHCP server 108 may use information associated with the device identifier and may provide address and protocol information for communication with a configuration server 104. Configuration information may be provided by a configuration server, such as configuration server 104, which may have been obtained at block 208.

At block 226, the method may end.

The steps of method 200 may occur in varying order. The prior description of method 200 is an exemplary embodiment and is not intended to limit the order or number of steps in the method. For example, a device may be provided to a user prior to a service request being received from a user. In some embodiments, certain authorization steps may occur prior to authentication. In other embodiments, authentication may occur prior to any authorization steps.

Figure 3:
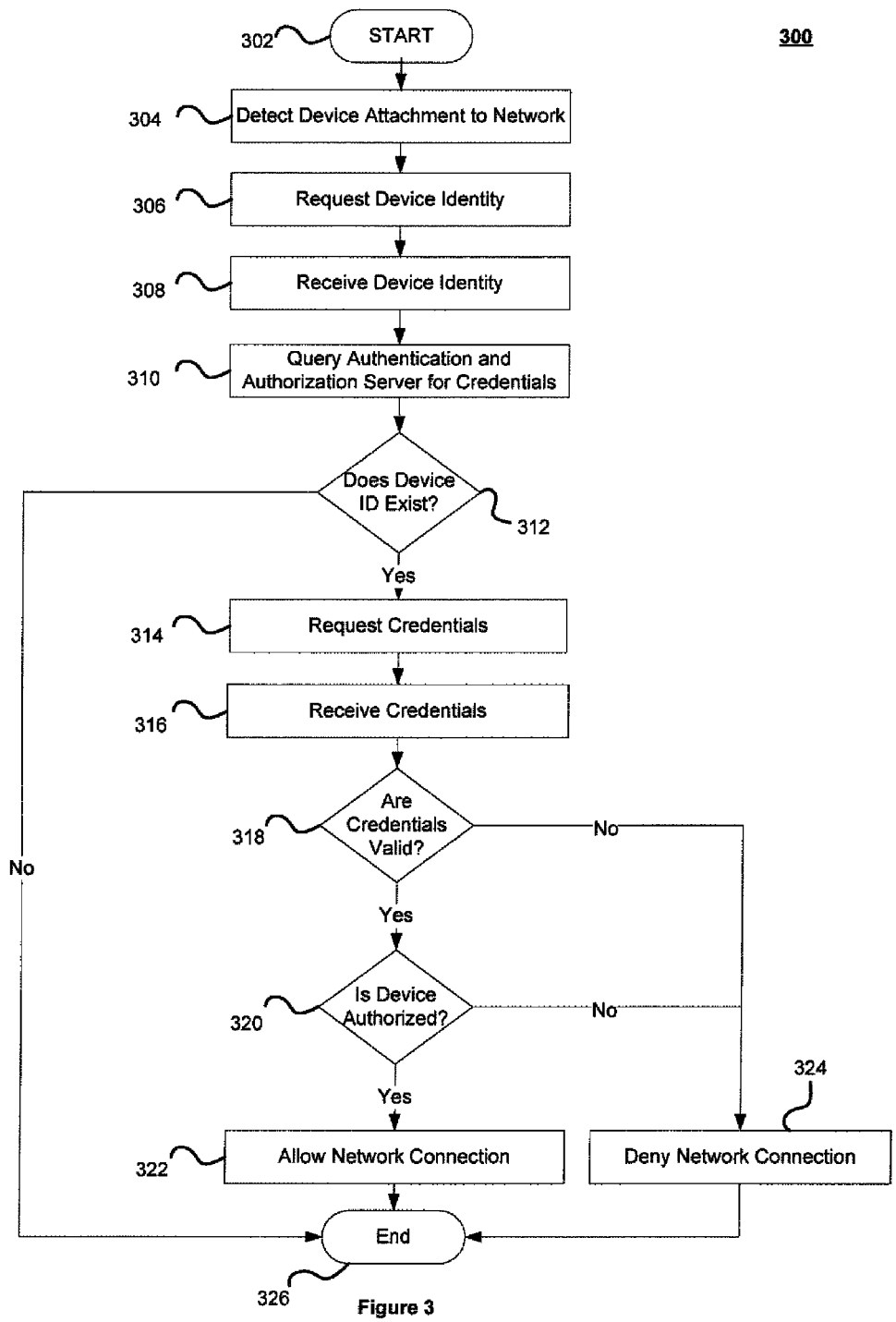
FIG. 3 depicts a method for authentication of a network attached device, in accordance with an exemplary embodiment.

FIG. 3 illustrates a flow diagram of a method 300 for authentication and authorization of network attached devices, in accordance with exemplary embodiment. This exemplary method 300 is provided by way of example, as there are a variety of ways to carry out the method. The method 300 shown in FIG. 3 can be executed or otherwise performed by one or a combination of various systems. The method 300 is described below may be carried out by the secure configuration system 100 shown in FIG. 1 by way of example, and various elements of the secure configuration system 100 are referenced in explaining the example method of FIG. 3. Each block shown in FIG. 3 represents one or more processes, methods or subroutines carried out in exemplary method 300. Referring to FIG. 3, exemplary method 300 may begin at block 302.

At block 304, a network element on a managed network, such as managed network 116 may detect the attachment of a device, such as computer 122, to the network. Detection of a device attached to a managed network may occur at an authenticator device, such as authenticator 120a or 120b. Detection and authentication may be performed by an authenticator which may be a trusted network device which has previously been authenticated by a managed network. For example, this may enable the authentication to occur close to the location of the attached device, such as at a customer premise, a branch office, a local store or other location. Authentication at this level may prevent the transmission of Ethernet traffic by an attached device across a managed network, until the device is authenticated. Additionally, an authenticator device may be located at a service provider, or network operator centralized location. In one or more embodiments, detection may occur at a centralized network element, such as authorization and authentication server 102. In some embodiments, detection may cause a previously authenticated device, which may detect the attachment, to message one or more network elements for authentication of the unauthenticated device.

At block 306, an authenticator, such as authenticator 120a or 120b, may request identification, such as a device identifier, from the attached device. The device identifier request may be received by the attached device. In one or more embodiments, the device may offer a unique device identifier upon attachment of the device to the network.

At block 308, a device identifier may be provided by the attached device. The device identifier may be a Medium Access Control (MAC) address, an Organizationally Unique Identifier and a serial number (OUI-Serial), an International Mobile Subscriber Identity, a username or other identifier.

At block 310, an authenticator, such as authenticator 120a or 120b, may query an authentication and authorization server, such as authentication and authorization server 102. In one or more embodiments, an authenticator, such as authenticator 120a or 120b may perform one or more functions of authentication and authorization server 102.

At block 312, authentication and authorization server 102 and/or authenticator 120a or 120b may query provisioning database 112, user information database 110 or other databases or servers to verify that a device identifier is known. The device identifier may be used to retrieve credentials or other information, such as service or device information associated with the device identifier. In one or more embodiments, the authentication and authorization of the device may be determined by rules using credentials and network operator policy information. For example, if a device attempts to authenticate in an invalid location, a location for which service is not authorized, network operator policy may deny service requests without attempting to authenticate the device. In another example, a device may be denied access based on account information, such as a delinquent account balance. Additionally, one or more policies enforced by authentication and authorization server 102 may enable a network to ensure a device's location and may facilitate E911 services. If the device identifier is not known or does not exist or cannot otherwise be verified by authentication and authorization server 102 and/or authenticator 120a or 120b, the method 300 may end at block 326. If the device identifier is known or otherwise verified the method may continue at block 314.

Authentication communication may utilize Extensible Authentication Protocol (EAP) [Request For Comments (RFC) 3748] or other EAP related protocols may be utilized. Authentication communication may utilize Extensible Authentication Protocol for Authentication and Key Agreement (EAP-AKA) [Request For Comments (RFC) 4187] for shared secrets. Other types of key management may be used. For example, digital certificates may be utilized and communication between an authentication server and an attached device may utilize Extensible Authentication Protocol Transport Layer Security (EAP-TLS) [Request For Comments (RFC) 2716].

At block 314, authentication and authorization server 102 and/or authenticator 120a or 120b may request authentication information from the attached device using such protocols. The response may be generated by the device and may use an algorithm indicated in the protocol. The response may be generated using cryptographic or heuristic methods. The device may use the algorithm to compute the response to the authorization server and may utilize a device identifier, a cryptographic key, encryption key and other device contained information.

At block 316, authentication and authorization server 102 and/or authenticator 120a or 120b may receive a response from the attached device.

At block 318, authentication and authorization server 102 and/or authenticator 120a or 120b may validate the credentials using the information received from an attached device. The authentication and authorization server may compute credentials using the same algorithm and information as the device. If the authentication and authorization server computed value matches the value in the device response then the credentials may be deemed valid. If credentials are validated by authentication and authorization server 102 and/or authenticator 120a or 120b, method 300 may continue at block 320. If no response is received from a device, method 300 may continue at block 324. If a response is received, but the credentials are not validated, method 300 may also continue at block 324.

At block 320, authentication and authorization server 102 and/or authenticator 120a or 120b may utilize one or more authorization rules or authorization policies to determine if a device is authorized to obtain one or more services or access to a network. Authorization for access for a device may depend on one or more factors including: an identity of a device, a type of device, a service type requested by the device, a location of the device, the network to which the device is attached, a time of the request, an account status of an account associated with the device, a network status or other policy or rule specified factors. If the device is authorized, the method may continue at block 322. If the device is not authorized, method 300 may continue at block 324.

At block 322, authentication and authorization server 102 and/or authenticator 120a or 120b may allow a network connection between an attached device and managed network 116. The device may subsequently receive addressing and configuration information using information stored in databases for this device identifier such as customer, service, network and device associated information.

At block 322, authentication and authorization server 102 and/or authenticator 120a or 120b may deny a network connection to one or more devices for which authentication has failed. In one or more embodiments, error messages or other information may be provided to the one or more devices.

At block 324, the method may end.

Figure 4:
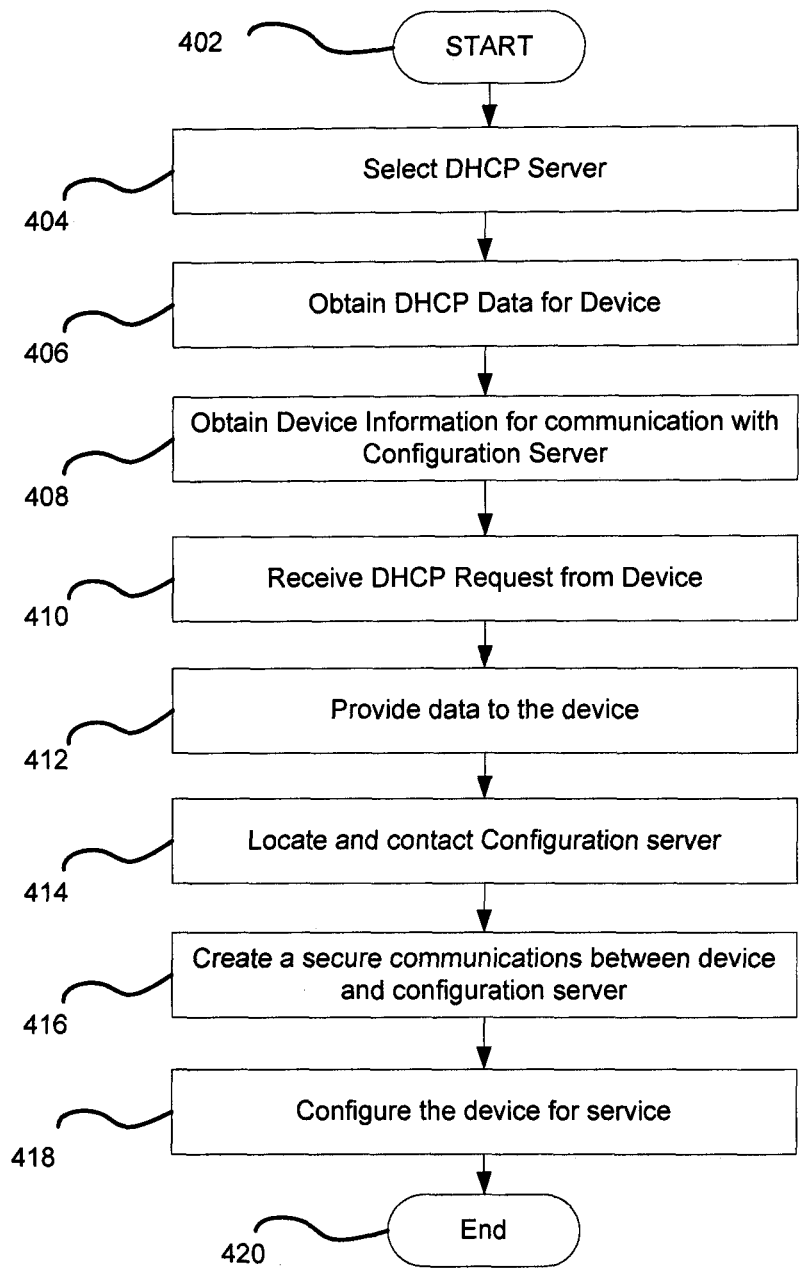
FIG. 4 depicts a method for addressing and configuration of a network attached device, in accordance with an exemplary embodiment.

FIG. 4 illustrates a flow diagram of a method 400 for IP addressing and DHCP configuration, and configuration of network attached devices, in accordance with an exemplary embodiment. This exemplary method 400 is provided by way of example, as there are a variety of ways to carry out the method. The method 400 shown in FIG. 4 can be executed or otherwise performed by one or a combination of various systems. The method 400 is described below may be carried out by the secure configuration system 100 shown in FIG. 1 by way of example, and various elements of the secure configuration system 100 are referenced in explaining the example method of FIG. 4. Each block shown in FIG. 4 represents one or more processes, methods or subroutines carried out in exemplary method 400. Referring to FIG. 4, exemplary method 400 may begin at block 402.

At block 402, authentication and authorization of the device may trigger the system to locate a server for IP addressing and DHCP configuration. At block 404, the IP network addressing domain may be determined from the subscriber data associated with the device and may be used to determine the DHCP server which may respond to queries from the device for IP configuration. Subscriber data may have been obtained, for example, in block 210 of method 200 and may have been associated with the device and stored in network accessible databases.

The process of method 300, which may authenticate and/or authorize the device, may assure that the MAC address of the device is a trusted address. The MAC address may be used to identify the device in order to securely use the DHCP protocol for communication with and/or configuration of the device.

At block 406, a DHCP server may be provided with the MAC address for the device which may be associated with its unique device identifier. The DHCP server may be provided with the network information for the device including at least one of: a host name, an IP address, a lease time, a subnet mask, a default gateway, a Network Time Protocol Server address, a Domain Name Server address, a broadcast address, a Domain Name, and other information that can be used to configure the network attached device. The DHCP server may be preconfigured with one or more portions of the information.

At block 408, the DHCP server may be provided with protocol requirements and an address or addresses which may enable the device to communicate with one or more configuration servers.

At block 410, the device may request information from the DHCP server. At block 412, the DHCP server may send information to the device. The device and server may communicate until the required data is exchanged. Information provided by one or more DHCP servers may be modified to support a type of device requesting service, a type of service requested, user subscription information, load balancing, redundancy or reliability concerns or for other purposes. For example, a DHCP server may provide from one pool of network addresses to a device if the device is requesting telecommunications services, from a second pool of addresses to a device if it is requesting video services or from a third pool of addresses if a device is requesting data services. The flexibility of the DHCP based configuration process may enable a service provider to more easily adapt to network loads, outages, support of new devices, support of new services and other needs.

At block 414, the device may use one or more addresses provided by the DHCP server to locate and contact one or more configuration servers.

At block 416, the configuration server may provide the method and address for secure communication.

At block 418, the device may communicate with one more configuration servers to obtain data to enable the device to deliver one or more services to a customer.

At block 420, the method may end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   supplying, to a provider of a device, a first unique device identifier and shared credentials to be stored on a device, wherein the device lacks fixed network information to configure the device prior to initiating configuration;
   obtaining device data for provisioning the device on a network;
   receiving a service request from a user of the device;
   storing device configuration information and a second unique device identifier in storage associated with the network, wherein the device configuration information includes at least one of: configuration information based on the device data obtained and configuration information based on the service request received;
   detecting attachment of the device to the network at an authenticator device;
   in response to detecting attachment of the device to the network, authenticating the device by requesting the first unique device identifier from the device, receiving the first unique device identifier from the device, querying the storage associated with the network to verify the first unique device identifier matches the second unique identifier, requesting a first authentication response be computed on the device using the first unique device identifier and the shared credentials, receiving the first authentication response from the device, computing a second authentication response using the second unique device identifier and the shared credentials, and comparing the second authentication response with the first authentication response, wherein the device is authenticated if the first authentication response matches the second authentication response;
   in response to device authentication, providing over the network to the device a configuration server network address for configuring the device, wherein the network address provided is based on the service request received from the user; and
   providing the device configuration information to the device using the configuration server network address.

2. The method of claim 1, wherein the first unique device identifier is based at least in part on a medium access control address associated with the device.

3. The method of claim 1, wherein the shared credentials include at least one of: a cryptographic key, an encryption key, a public key, a shared secret, and a digital certificate.

4. The method of claim 1, wherein the device data obtained for provisioning the device on a network includes at least one of: device manufacturer, device model number, device class, device identifier, hardware capabilities of the device, software capabilities of the device, dynamic host configuration protocol support enabled by the device, authentication protocol requirements of the device, and a shared cryptographic secret.

5. The method of claim 1, wherein authenticating the device utilizes at least one of: secure sockets layer, transport secure layer, and a protocol utilizing extensible authentication.

6. The method of claim 1, wherein receiving a service request from a user of the device includes obtaining information about the type of service and service options ordered by the user from a service provider associated with the network.

7. The method of claim 1, wherein authenticating the device further includes scanning the device for at least one of: antivirus information, operating system version, operating system patch level, and a device status.

8. The method of claim 1, wherein authenticating the device further includes managing one or more transmission characteristics permitted for the device on the network.

9. The method of claim 1, wherein authenticating the device stores device information on the storage associated with the network utilizing at least one of: Remote Authentication Dial In User Service, DIAMETER, and hypertext transfer protocol.

10. The method of claim 1, wherein device configuration information is provided to the device utilizing dynamic host configuration protocol.

11. The method of claim 1, wherein the device data for provisioning the device on a network includes dynamic host configuration protocol information.

12. The method of claim 1, wherein providing the device configuration information to the device includes providing at least one of: a host name, an IP address, a lease time, a subnet mask, a default gateway, a Network Time Protocol Server address, a Domain Name Server address, a broadcast address, and a Domain Name.

13. The method of claim 1, wherein authentication further comprises preventing transmission of Ethernet traffic of the device prior to completion of authentication.

14. The method of claim 1, wherein authenticating the device further comprises accessing a network operator policy stored in the network and authenticating the device based on the network operator policy.

15. The method of claim 14, wherein the network operator policy comprises at least one of: a location-based policy and an emergency policy.

16. A non-transitory computer readable medium comprising code to perform the method of claim 1.

17. A system, comprising:
one or more databases for storing a first unique device identifier, device configuration data, service network data and user service request data wherein the one or more databases are communicatively coupled to a network; and
a network element communicatively coupled to the network wherein the network element is configured to:
detect attachment of a device to the network, wherein the device lacks fixed network information to configure the device prior to initiating configuration;
in response to detecting attachment of the device, authenticating the device by requesting
a second unique device identifier from the device, receiving the second unique device identifier from the device, querying the one or more databases coupled to the network to verify the second unique device identifier matches a first unique identifier, requesting a first authentication response be computed on the device using the second unique device identifier and shared credentials stored on the device, receiving a first authentication response from the device, computing a second authentication response using the second unique device identifier and shared credentials stored in the one or more databases coupled to the network, and comparing the second authentication response with the first authentication response, wherein the device is authenticated if the first authentication response matches the second authentication response;
provide over the network to the device a network address for configuring the device in response to authenticating the device, wherein the network address provided is based on a service request received from the user prior to detecting attachment of the device; and
provide configuration information to the device using the network address for configuring the device.

18. The system of claim 17, wherein the second unique device identifier is based at least in part on a medium access control address associated with the device.

19. The system of claim 17, wherein network element further receives device data for provisioning the device on a network, wherein the device data includes at least one of: device manufacturer, device model number, device class, device identifier, hardware capabilities of the device, software capabilities of the device, dynamic host configuration protocol support enabled by the device, and authentication protocol requirements of the device.

20. The system of claim 17, wherein authenticating the device utilizes at least one of: a secure sockets layer protocol, a transport secure layer protocol, and a protocol utilizing extensible authentication.

21. The system of claim 17, wherein network information is provided to the device utilizing dynamic host configuration protocol.

22. The system of claim 17, wherein the device data for provisioning the device on a network includes dynamic host configuration protocol information.

23. The system of claim 17, wherein providing the device configuration information to the device includes providing at least one of: a host name, an IP address, a lease time, a subnet mask, a default gateway, a Network Time Protocol Server address, a Domain Name Server address, a broadcast address, and a Domain Name.

* * * * *